(12) United States Patent
Sogabe

(10) Patent No.: US 8,559,135 B2
(45) Date of Patent: Oct. 15, 2013

(54) MAGNETIC TAPE REEL HAVING A POSITIONING MARK CAPABLE OF BEING DETECTED USING A CONTACTLESS DETECTOR, TAPE CARTRIDGE USING THE SAME, RECORDING AND REPRODUCING APPARATUS FOR RECORDING AND REPRODUCING INFORMATION IN THE TAPE CARTRIDGE, AND INFORMATION RECORDING AND REPRODUCING METHOD THEREOF

(75) Inventor: Teruo Sogabe, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 1223 days.

(21) Appl. No.: 12/188,024

(22) Filed: Aug. 7, 2008

(65) Prior Publication Data

US 2009/0040658 A1    Feb. 12, 2009

(30) Foreign Application Priority Data

Aug. 8, 2007  (JP) ................................. 2007-207127

(51) Int. Cl.
*G11B 23/02*   (2006.01)
(52) U.S. Cl.
USPC ........................................... 360/132

(58) Field of Classification Search
USPC .......................................................... 360/132
See application file for complete search history.

(56) References Cited

U.S. PATENT DOCUMENTS

| 5,576,905 | A  | * | 11/1996 | Garcia et al. ............... 360/73.14 |
| 6,508,427 | B2 | * | 1/2003  | Huettenegger et al. ....... 242/340 |
| 7,354,016 | B2 | * | 4/2008  | Hiraguchi ................... 242/609.4 |
| 2005/0023397 | A1 | | 2/2005 | Hiraguchi |

FOREIGN PATENT DOCUMENTS

JP         2006-85745 A    3/2006

* cited by examiner

*Primary Examiner* — Joseph Feild
*Assistant Examiner* — Gustavo Polo
(74) *Attorney, Agent, or Firm* — Birch, Stewart, Kolasch & Birch, LLP

(57) ABSTRACT

A magnetic tape reel that has a plurality of gear teeth capable of engaging with a plurality of engagement gear teeth provided with a reel engaging portion of a recording and reproducing apparatus and upon which magnetic tape can be wound, the magnetic tape reel comprising: a hub portion including a cylindrical portion upon which the magnetic tape can be wound and the plurality of gear teeth; and a positioning mark capable of being detected using a contactless detector, the positioning mark being provided for aligning a specific gear tooth A from the plurality of gear teeth with a specific engagement gear tooth B from the plurality of engagement gear teeth.

7 Claims, 15 Drawing Sheets

MAGNETIC TAPE REEL HAVING A POSITIONING MARK CAPABLE OF BEING DETECTED USING A CONTACTLESS DETECTOR, TAPE CARTRIDGE USING THE SAME, RECORDING AND REPRODUCING APPARATUS FOR RECORDING AND REPRODUCING INFORMATION IN THE TAPE CARTRIDGE, AND INFORMATION RECORDING AND REPRODUCING METHOD THEREOF

BACKGROUND OF THE INVENTION

1. Field of the Invention

The present invention relates to a magnetic tape reel, a tape cartridge using the same, a recording and reproducing apparatus for recording and reproducing information in the tape cartridge, and an information recording and reproducing method thereof.

2. Description of Related Art

FIG. 18 is a cross-section illustrating the internal structure of a conventional tape cartridge in which a single reel having an upper flange and a lower flange is housed within a case 101 in a rotatable state, whereas FIG. 19 is a plan view illustrating the interior of the tape cartridge shown in FIG. 18. Note that a first container 101b, of which the case 101 shown in FIG. 18 is configured, has been omitted from FIG. 19.

A magnetic tape reel 102 (hereinafter, called a "reel") is pressed in the upward direction in FIG. 18 by a compression coil spring 128 that acts via a shaft 127. In order to run magnetic tape 103, first, a plurality of engagement gear teeth provided with a reel engaging portion 108 of which a recording and reproducing apparatus is configured are engaged with the plurality of gear teeth provided with the reel. The engagement gear teeth for engaging with a specific gear tooth among the plurality of gear teeth are not stipulated, and the engagement gear teeth that engage with the stated specific gear tooth differ each time the reel engaging portion 108 and the reel 102 engage.

Next, the reel 102 is lifted toward the first container 101a by the reel engaging portion 108. The reel 102 is then rotated at a position slightly distanced from a second container 101b. When the reel 102 is rotated, the magnetic tape 103 is wound upon the reel 102 or let out from the reel 102. As shown in FIG. 19, a metallic lead member 106 is affixed to the end of the tape that is let out. When the tape cartridge is loaded into a a receiving portion of the recording and reproducing apparatus, the lead member 106 is caught by a lead member catching portion of the recording and reproducing apparatus, after which the magnetic tape 103 is pulled out and the lead member 106 is attached to a drive reel. In this manner, the magnetic tape 103 is supplied to a drive system in the recording and reproducing apparatus that includes a guide roller 104 (for example, see JP 2006-085745A).

There are anywhere from several tens to several hundreds of both the plurality of engagement gear teeth in the reel engaging portion, and the plurality of gear teeth provided with the reel corresponding to the engagement gear teeth. It is extremely difficult to form all of the engagement gear teeth and gear teeth with precision. If the shape of each engagement gear tooth and each gear tooth is actually measured, a formation error of several tens of microns to several hundred microns can be confirmed with respect to, for example, the height and angle of the sloped surfaces of the teeth. As a result of the presence of this formation error, when the reel engaging portion and the reel are in an engaged state, the reel tilts in an arbitrary direction, or the position of the reel within the case differs slightly each time it is engaged with the reel engaging portion. This leads to instability in the running position of the magnetic tape, instability in the winding position of the tape upon the reel and so on, which in turn makes it more likely that, for example, the edge of the tape will come into contact with the upper flange or the lower flange. If the edge of the tape comes into contact with a flange, there is the chance that the tape will be damaged, such as the edge of the tape being folded, which increases the likelihood of errors occurring during loading and so on.

SUMMARY OF THE INVENTION

Therefore, with the foregoing in mind) it is an object of the present invention to provide, with respect to the repeated engagement of a reel engaging portion and a reel, a reel capable of suppressing instability in the attitude, position, and the like of the reel when the reel engaging portion and the reel are engaged, a tape cartridge that uses such a reel, a recording and reproducing apparatus for recording and reproducing information in the tape cartridge, and an information recording and reproducing method for the recording and reproducing apparatus.

The magnetic tape reel of the present invention is a magnetic tape reel that has a plurality of gear teeth capable of engaging with a plurality of engagement gear teeth provided with a reel engaging portion of a recording and reproducing apparatus and upon which magnetic tape can be wound, and comprises: a hub portion including a cylindrical portion upon which the magnetic tape can be wound and the plurality of gear teeth; and a positioning mark capable of being detected using a contactless detector, the positioning mark being provided for aligning a specific gear tooth A from the plurality of gear teeth with a specific engagement gear tooth B from the plurality of engagement gear teeth.

The tape cartridge of the present invention comprises: the magnetic tape reel of the present invention; magnetic tape wound upon the magnetic tape reel; and a case that has a space capable of housing the magnetic tape reel and the magnetic tape and that has an opening portion that enables the plurality of gear teeth of the magnetic tape reel to be exposed to the exterior of the case.

The recording and reproducing apparatus of the present invention is a recording and reproducing apparatus for recording information onto and reproducing information from the tape cartridge described above, and comprises: a receiving portion that allows the tape cartridge to be housed; a reel engaging portion that has a plurality of engagement gear teeth capable of engaging with the plurality of gear teeth provided with the magnetic tape reel, the plurality of engagement gear teeth including a specific engagement gear tooth B capable of being constantly engaged with the specific gear tooth A; a magnetic head unit capable of recording information onto the magnetic tape and reproducing information that has been recorded onto the magnetic tape; a detection portion that is provided on the reel engaging portion that is capable of detecting the positioning mark of the magnetic tape reel; and a rotary machine capable of rotating the reel engaging portion.

The information recording and reproducing method of the present invention is an information recording and reproducing method for recording information onto and reproducing information from the tape cartridge using the recording and reproducing apparatus described above, and comprises the steps of: detecting the positioning mark using the detection portion; engaging the specific gear tooth A from the plurality of gear teeth with the specific engagement gear tooth B from the plurality of engagement gear teeth; and recording information onto the magnetic tape or reproducing=information that has been recorded onto the magnetic tape.

DETAILED DESCRIPTION OF THE INVENTION

Hereinafter, an example of a magnetic tape reel, an example of a tape cartridge that uses the magnetic tape reel, an example of a recording and reproducing apparatus for recording and reproducing information in the tape cartridge, and an example of an information recording and reproducing method according to the present invention shall be described using the drawings.

Embodiment 1

Embodiment 1 shall describe an example of a magnetic tape reel and an example of a tape cartridge that uses the magnetic tape reel, according to the present invention.

Figure 1:
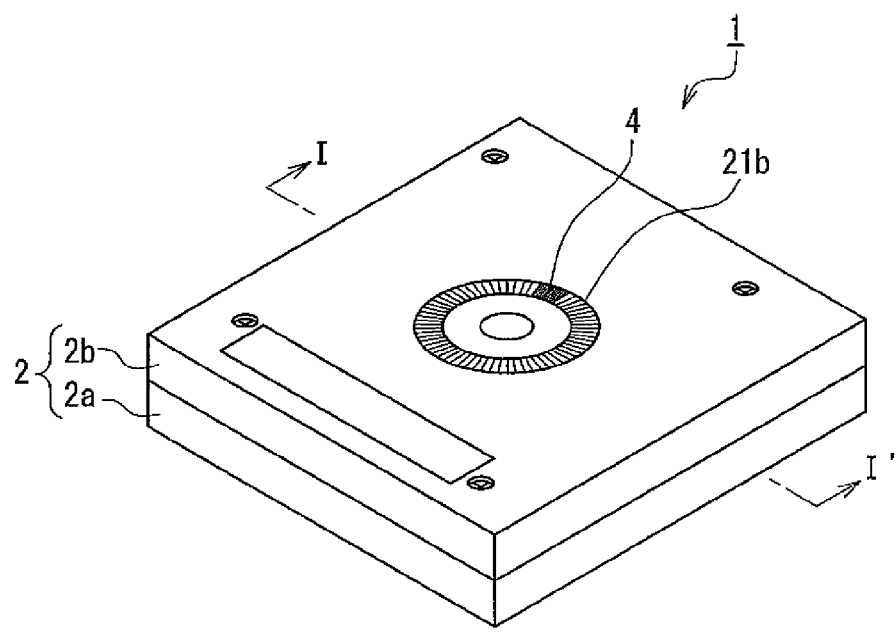
FIG. 1 is a perspective view illustrating an example of a tape cartridge according to an embodiment of the present invention.
Figure 2:
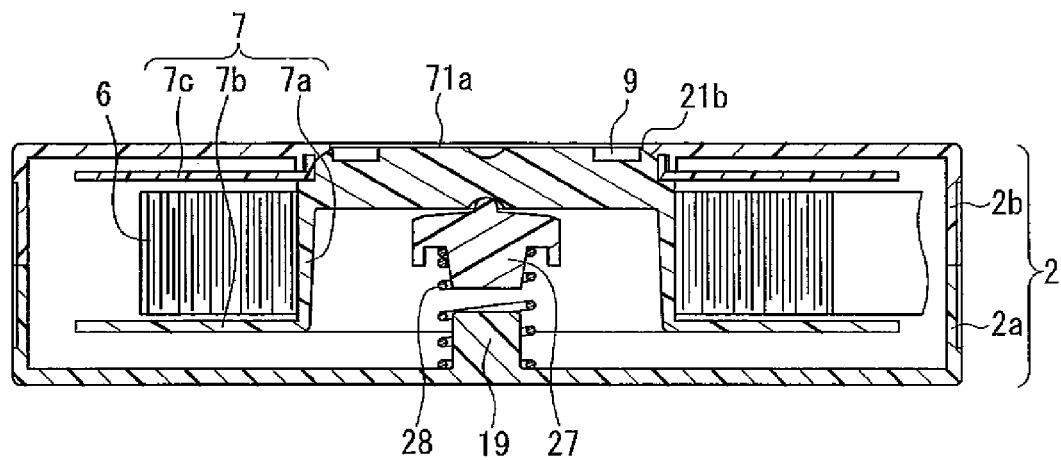
FIG. 2 is an enlarged cross-section of the tape cartridge illustrated in FIG. 1, as viewed along the I-I' line.

FIG. 1 is a perspective view of an example of the tape cartridge according to the present embodiment, and FIG. 2 is an enlarged cross-section of the tape cartridge illustrated in FIG. 1, as viewed along the I-I' line. Although in FIGS. 1 and 2, a first container 2a is illustrated as being located below a second container 2b for ease of explanation, it should be noted that the cartridge is typically used in a state in which the first container 2a is located above the second container 2b.

A tape cartridge 1 of the present embodiment shown in FIG. 1 includes, as shown in FIG. 2, a case 2 and magnetic tape 6 (also sometimes referred to simply as "tape 6" hereinafter) housed within the case 2. The case 2 is formed by aligning the first container 2a and the second container 2b so that an internal space is formed therebetween, and then fastening the containers to one another using screws or the like. The tape 6 is wound upon a magnetic tape reel 7 (sometimes shortened to "reel" hereinafter) contained within the case 2 in a rotatable state, and can be let out from the reel 7 and pulled outside of the case 2 through a tape port (not shown) in the case 2. A metallic lead member (not shown) is affixed to the let-out end of the tape 6, and when the tape cartridge is loaded into a receiving portion of the recording and reproducing apparatus, the lead member is caught by a lead member catching portion of the recording and reproducing apparatus, after which the tape 6 is pulled out and the lead member is attached to a drive reel.

Within the case 2, the reel 7 is biased in the upward direction in FIG. 2 by a spring-shaped elastic member such as a compression coil spring 28 that acts via a shaft 27. This prevents the reel 7 from freely rotating when not in use. Note that a guide post 19 whose outer diameter is less than the inner diameter of the compression coil spring 28 is provided roughly in the center of the base portion of the first container 2a. The compression coil spring 28 is prevented from falling out of position by inserting the guide post 19 into the inside of the compression coil spring 28.

Figure 3:
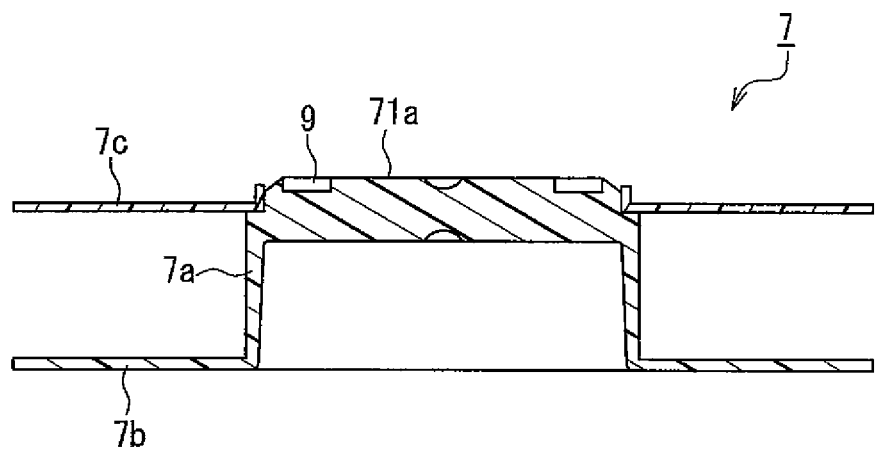
FIG. 3 is a cross-section of a reel of which the tape cartridge illustrated in FIG. 1 is configured.

As shown in FIG. 3, the reel 7 has, for example, a hub portion 7a serving as a tubular portion onto which tape is wound, a disk-shaped first flange 7b formed, for example, integrally on one end of the hub portion 7a, and a second flange 7c that is, for example, welded to the other end of the hub portion 7a. The hub portion 7a is, for example, a substantially cylindrical closed-end body that has a cavity.

Figure 6:
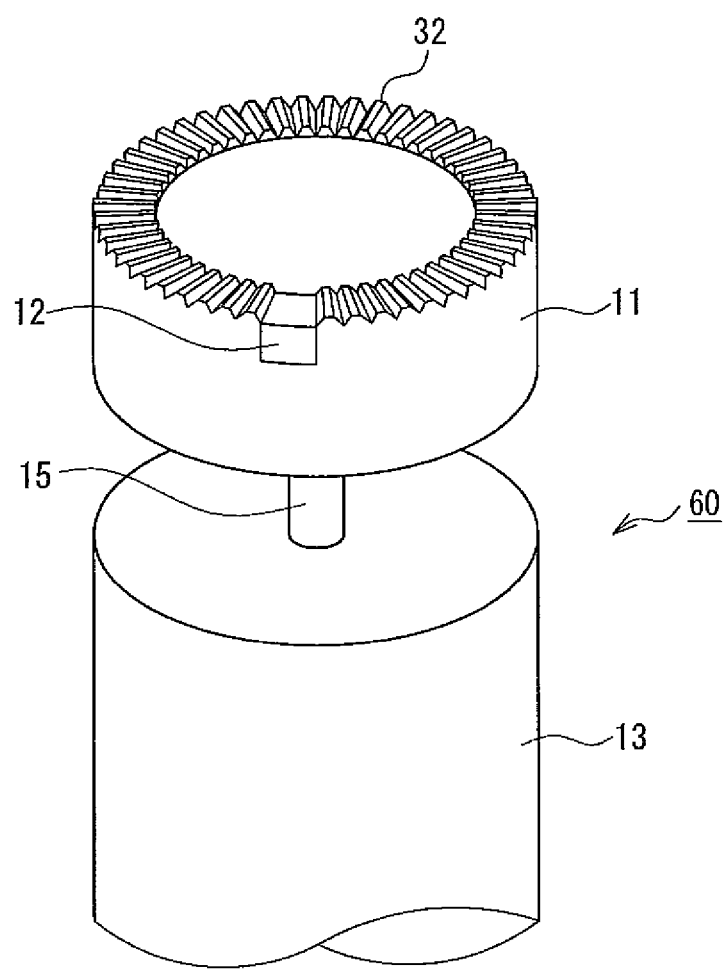
FIG. 6 is a perspective view of an example of a drive shaft of which an example of a recording and reproducing apparatus according to an embodiment of the present invention is configured.

A plurality of gear teeth 9 (see FIG. 4) are formed in the external surface 71a of the base portion of the substantially cylindrical closed-end hub portion 7a in radial form extending toward the outer edge of the hub portion 7a. the plurality of gear teeth 9 are capable of engaging with a plurality of engagement gear teeth 32 provided with a reel engaging portion of the recording and reproducing apparatus (see FIG. 6).

It is preferable for the plurality of gear teeth 9 to be formed close to the outer edge of the base portion of the hub portion. In this case, the movement distance of the gear teeth 9 in the circumferential direction relative to the rotational angle of the reel 7 is greater, and thus the reel 7 and the reel engaging portion 11 can be kept securely engaged even when the reel 7 is rotated at high speeds.

As shown in FIGS. 1 and 2, the external surface 71a of the base portion of the hub portion 7a is exposed to the exterior of the case 2 via an opening portion 21b provided with the base of the second container 2b. The reel 7 is rotated in a state in which the engagement gear teeth 32 of the reel engaging portion of the recording and reproducing apparatus (see FIG. 6) inserted into the case 2 via the opening portion 21b are engaged with the gear teeth 9 formed in the reel 7. When the reel 7 rotates, the tape 6 is taken up onto the reel 7, or let out from the reel 7.

Figure 4:
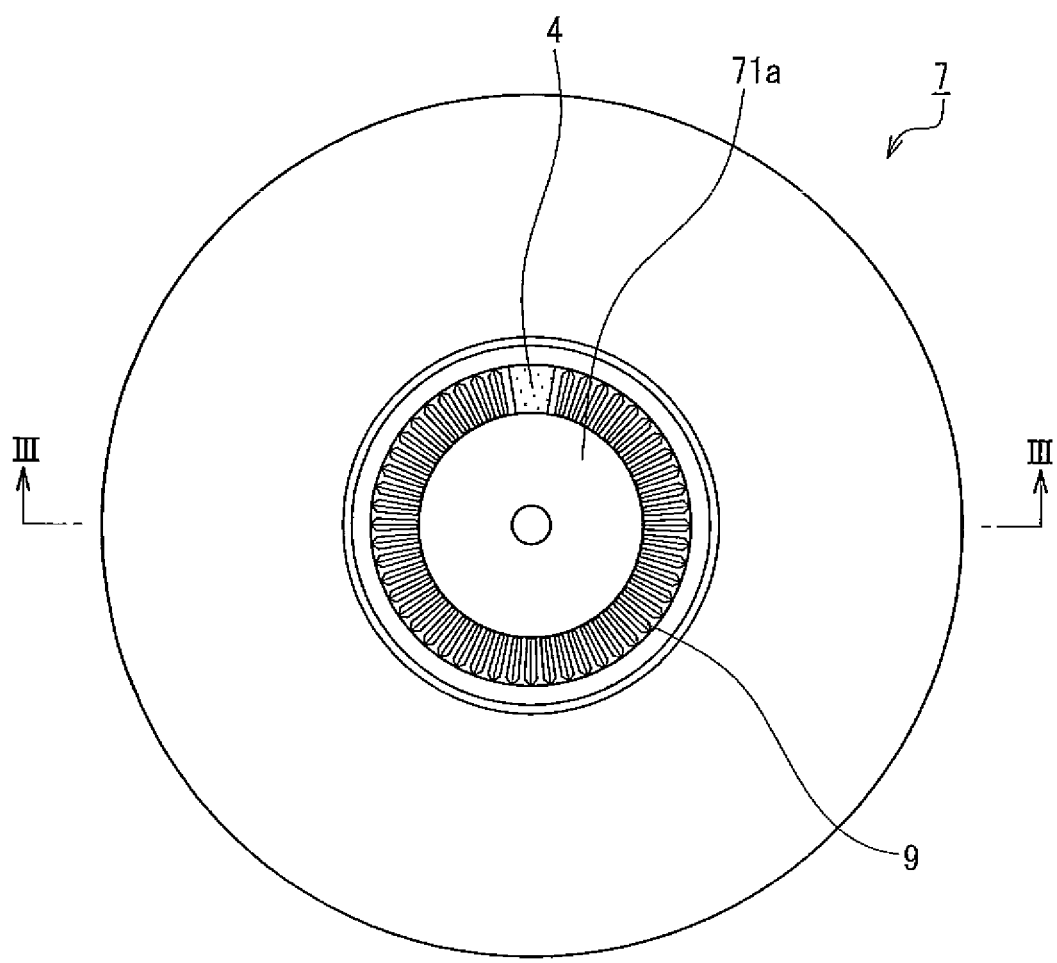
FIG. 4 is a plan view of the reel of which the tape cartridge illustrated in FIG. 1 is configured.
Figure 5:
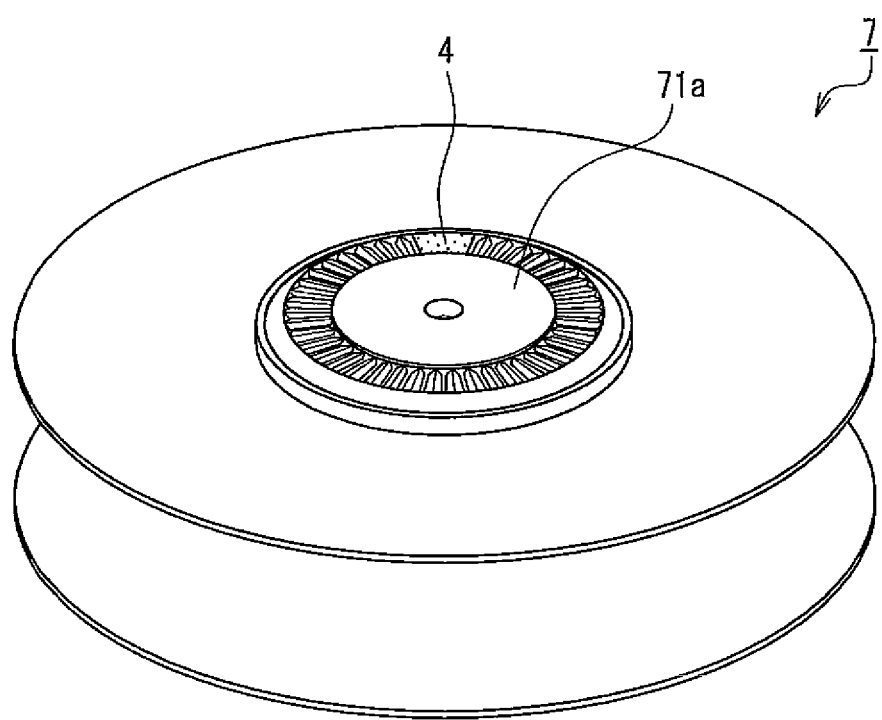
FIG. 5 is a perspective view of the reel of which the tape cartridge illustrated in FIG. 1 is configured.

FIG. 4 is a plan view of an example of the reel 7 of which the tape cartridge illustrated in FIGS. 1 and 2 is configured, and FIG. 5 is a perspective view of the same. As shown in FIGS. 4 and 5, a positioning mark 4 is provided on the external surface 71a of the base portion of the hub portion. In the present embodiment, the positioning mark 4 is, for example, a metallic piece processed so as to have a mirror surface. The metallic piece is anchored to the external surface 71a of the base portion of the hub portion by, for example, being affixed thereto using an adhesive or the like. The positioning mark 4 can be detected by a detection portion (a contactless detector) 12 provided with the recording and reproducing apparatus, described later (see FIGS. 7 and 8).

Figure 7:
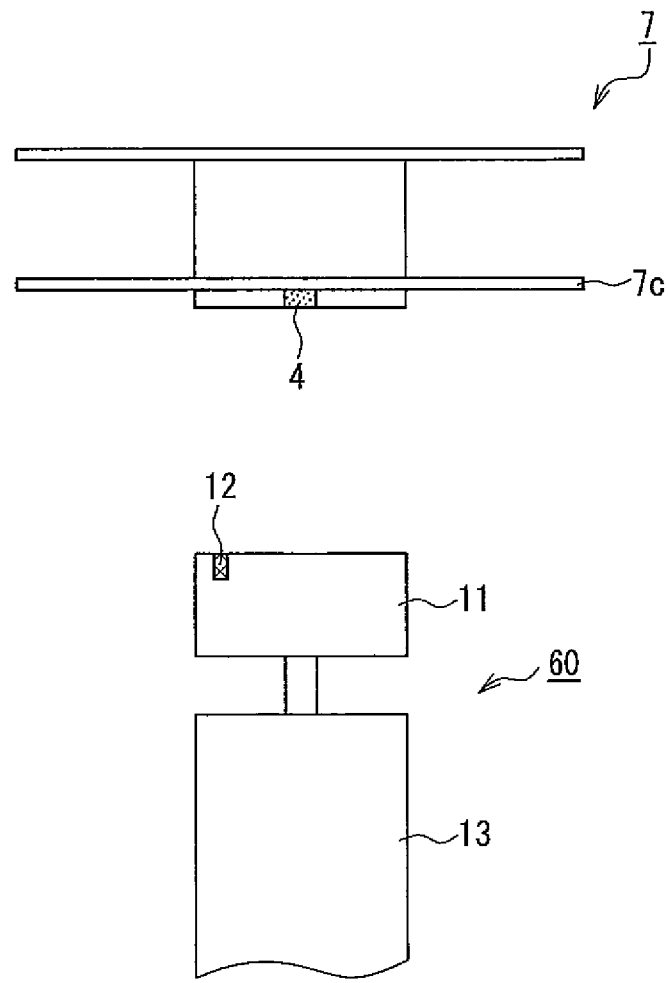
FIG. 7 is a schematic diagram illustrating the state of aligning the reel with a reel engaging portion, according to an embodiment of the present invention.
Figure 8:
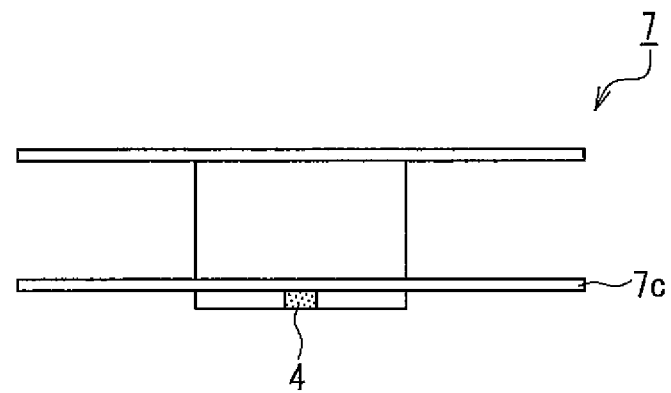
FIG. 8 is a schematic diagram illustrating the state of aligning the reel with a reel engaging portion, according to an embodiment of the present invention.
Figure 8:
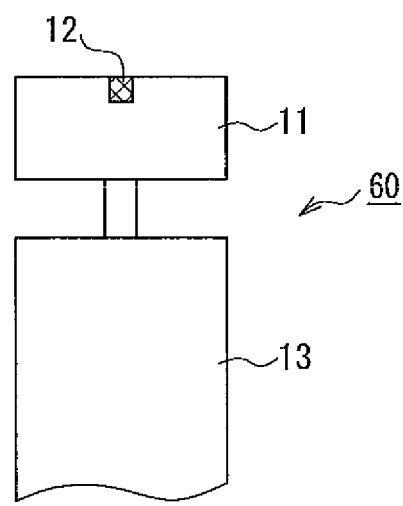
Figure 9A:
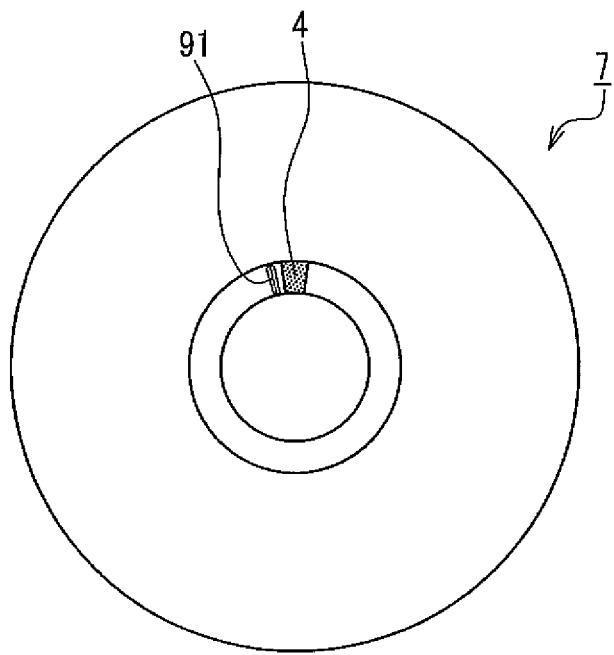
FIG. 9A is a diagram illustrating the base portion of a reel 7 illustrated in FIG. 7.
Figure 9B:
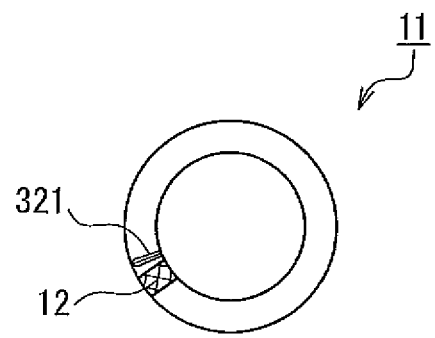
FIG. 9B is a plan view of a reel engaging portion 11 illustrated in FIG. 7.
Figure 10A:
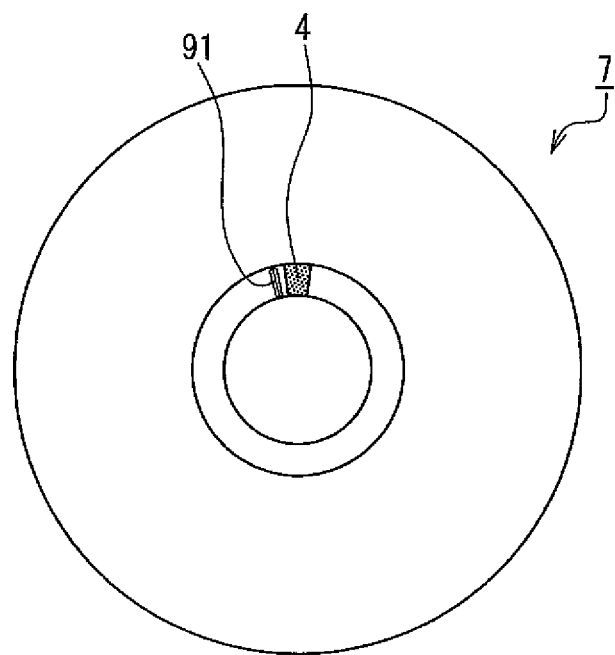
FIG. 10A is a diagram illustrating the base portion of a reel 7 illustrated in FIG. 8.
Figure 10B:
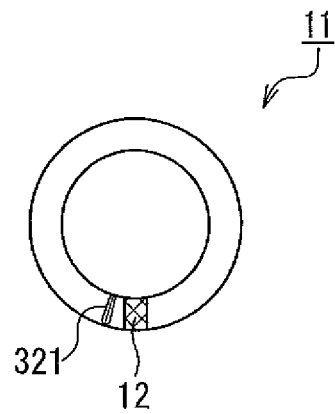
FIG. 10B is a plan view of a reel engaging portion 11 illustrated in FIG. 8.

Meanwhile, as shown in FIGS. 6 through 10, the detection portion 12 is provided on the reel engaging portion 11 of the recording and reproducing apparatus, which shall be mentioned later. Note that FIG. 6 is a perspective view of a drive shaft; the drive shaft 60 includes a rotary machine 13, such as a motor for enabling the reel engaging portion 11 to be rotated, the reel engaging portion 11, and the detection portion 12. The rotational movement of the rotary machine 13 is transmitted to the reel engaging portion 11 via the rotating shaft 15. FIG. 7 is a diagram showing the reel 7 and the drive shaft 60 from the front in a state where a specific gear A and a specific engagement gear B are not aligned, whereas FIG. 8 is a diagram showing the reel 7 and the drive shaft 60 from the front in a state where the specific gear A and the specific engagement gear B are aligned. FIG. 9A is a diagram illustrating the base portion of the reel 7 illustrated in FIG. 7, and FIG. 9B is a plan view of the reel engaging portion 11 illustrated in FIG. 7. Finally, FIG. 10A is a diagram illustrating the base portion of the reel 7 illustrated in FIG. 8, and FIG. 10B is a plan view of the reel engaging portion 11 illustrated in FIG. 8. In FIGS. 7 and 8, the engagement gear teeth 32 (see FIG. 6) have been omitted for the sake of simplicity. Furthermore, in FIGS. 9 and 10, the gear teeth 9 (see FIG. 4) aside from a specific gear tooth A91 and the engagement gear teeth 32 (see FIG. 6) aside from a specific engagement gear tooth B321 have also been omitted for the sake of simplicity. The gear tooth A91 is identical to the other gear teeth 9, and the engagement gear tooth B321 is identical to the other engagement gear teeth 32.

For example, if the detection portion 12 is provided with the reel engaging portion 11 so that the specific gear tooth A91 from the plurality of gear teeth 9 and the specific engagement gear tooth B321 from the plurality of engagement gear teeth 32 are aligned when the positioning mark 4 has been detected by the detection portion 12, the gear tooth A91 and the engagement gear tooth B321 consistently can be engaged each time the reel engaging portion 11 and the reel 7 are engaged.

If the gear tooth A91 and the engagement gear tooth B321 can be constantly engaged in the repeated engagement of the reel engaging portion 11 and the reel 7, the attitude, position, and the like of the reel 7 while engaged with the reel engaging portion 11 always remains constant. For this reason, differences in the attitude, position, and so on of the reel 7 within the case 2 in the thickness direction of the case 2 that occur each time the reel engaging portion 11 and the reel 7 are engaged due to the formation error of the gear teeth 9 and/or the engagement gear teeth 32 can be suppressed, and as a result, instability in the running position of the magnetic tape 6 can be suppressed. Accordingly, with the reel and tape cartridge of the present invention, it is possible to suppress the chance of damage such as folded edges being dealt to the tape, and thus it is possible to prevent the occurrence of errors during loading and the like.

As shall be described later, it should be noted that a signal for stopping rotation is sent from the control portion 67 to the rotary machine 65 upon the control portion 67 recognizing that the positioning mark 4 has been detected by the detection portion 12 (see FIG. 16), and therefore it takes a predetermined amount of time for the rotary machine 65 to stop after the positioning mark 4 has been detected by the detection portion 12. For example, if the rotational speed of the rotary machine 65 is decreased to an extent whereby this predetermined amount of time can be ignored, the alignment and engagement of the gear tooth A91 and the engagement gear tooth B321 is possible.

Rather than reducing the rotational speed of the rotary machine 65, the alignment of the gear tooth A91 and the engagement gear tooth B321 may be carried out, for example, as follows.

For example, taking into consideration the speed at which the rotary machine 65 rotates the reel engaging portion 11 and the control time required to stop the stated rotation, the distance between the specific gear tooth A and the positioning mark 4 in the circumferential direction and the distance between the detection portion 12 and the specific engagement gear tooth B in the circumferential direction are determined so that the specific gear tooth A and the specific engagement gear tooth B are aligned after the rotation of the reel engaging portion 11 stops.

For example, after the positioning mark 4 has been detected by a detection portion 66 while the reel engaging portion 11 is rotated at a predetermined speed by the rotary machine 65, the rotation of the reel engaging portion 11 is stopped; then, the reel engaging portion 11 is rotated in the opposite direction at a speed slower than the stated predetermined speed, and the positioning mark 4 is re-detected. The speed of this reverse rotation may be slow enough that the control time required to stop the rotation can be ignored. This makes it possible to quickly and accurately align the specific gear tooth A and the specific engagement gear tooth B and is therefore preferable.

As long as it is an item that is recognizable by a contactless detector, the positioning mark 4 is not limited to a metallic piece processed so as to have a mirror surface; it is preferable for the positioning mark 4 to be at least one type selected from a group made up of the following: a surface of a different color than that surrounding the positioning mark 4; a mirror surface; a recessed or protruding step; a through-hole; a character; and a code symbol. A two-dimensional bar code, a QR Code®, and the like can be given as examples of code symbols.

The disposal position and the like of the positioning mark 4 are not particularly limited as long as the positioning mark 4 can be detected by the detection portion 12. However, it is preferable for the positioning mark 4 to be disposed, for example, toward the outer side of the surface of the reel 7 that faces the reel engaging portion 11. This is because the specific gear tooth A and the specific engagement gear tooth B can be more accurately aligned if the positioning mark 4 is provided on an area further toward the outer side than the center portion of the stated surface.

Figure 11A:
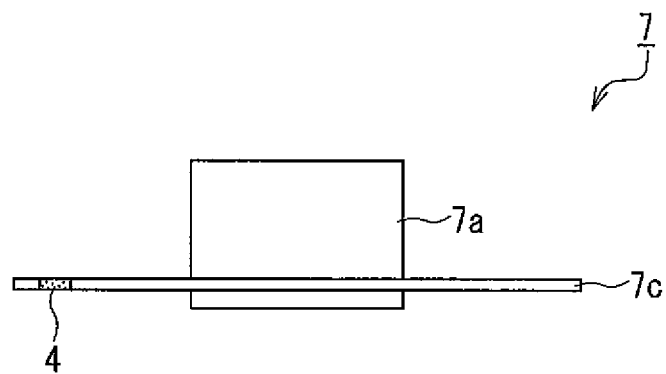
FIG. 11A is a frontal schematic diagram illustrating another example of a reel according to an embodiment of the present invention.
Figure 11B:
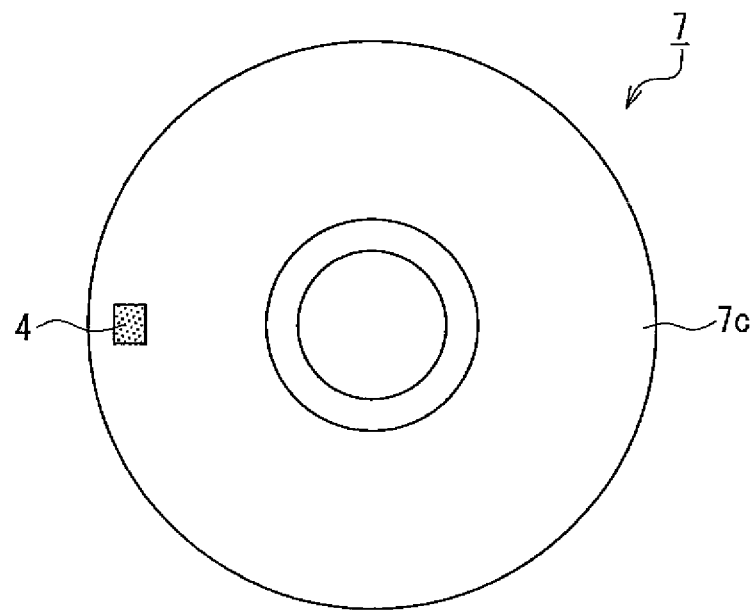
FIG. 11B is a schematic plan view of the reel illustrated in FIG. 11A.
Figure 12A:
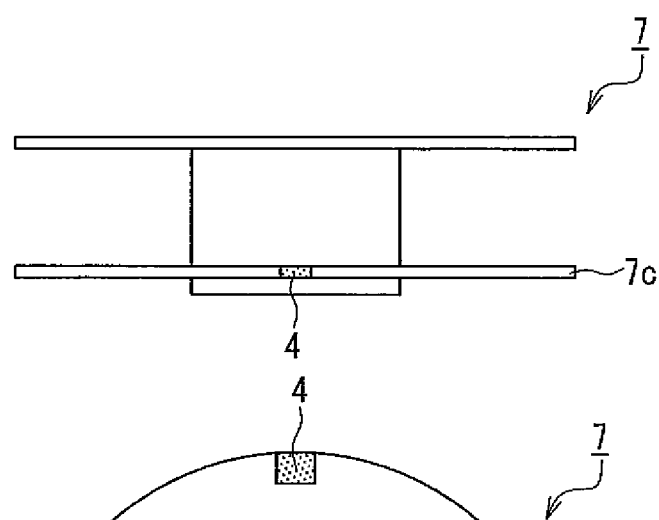
FIG. 12A is a frontal schematic diagram illustrating yet another example of a reel according to an embodiment of the present invention.
Figure 12B:
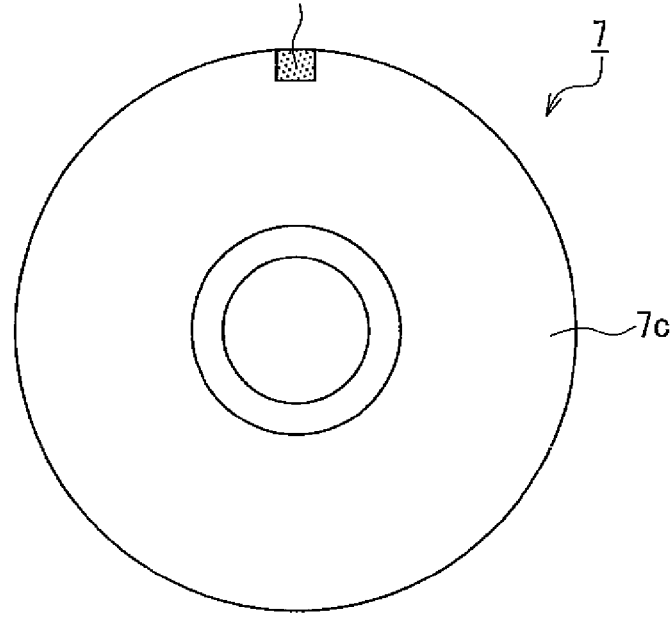
FIG. 12B is a schematic plan view of the reel illustrated in FIG. 12A.
Figure 13:
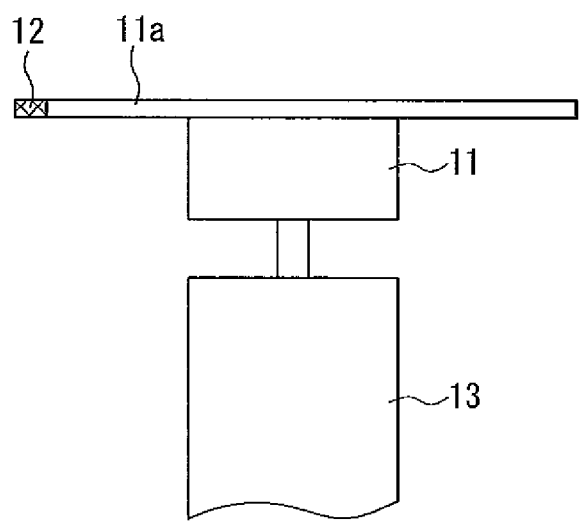
FIG. 13 is a frontal schematic view of another example of a drive shaft of which an example of a recording and reproducing apparatus according to an embodiment of the present invention is configured.

To be more specific, in the case where, for example, the reel 7 includes a flange 7c extending in the radial direction from the outer periphery of the hub portion 7a, as shown in FIGS. 11A and 11B, it is preferable for the positioning mark 4 to be disposed both facing the surface of the reel engaging portion that will face the flange 7c and in the vicinity of the outer periphery of the flange 7c. In addition, it is preferable for the positioning mark 4 to be disposed both facing the surface of the reel engaging portion that will face the flange 7c and on the outer periphery of the flange 7c, as shown in FIG. 12. With respect to, for example, the reel illustrated in FIG. 12, it is preferable for the reel engaging portion 11 to further include, for example, a collar portion 11a having a flat surface perpendicular to the axial direction of the reel engaging portion 11, as shown in FIG. 13. In this case, it is preferable for the position, in the radial direction, of the detection portion 12 in the collar portion 11a to be identical to the position, in the radial direction, of the positioning mark 4 in the flange 7c. For example, it is preferable for the collar portion 11a to have the same diameter as the flange 7c, and for the detection portion 12 to be disposed on the outer edge of the collar portion 11a. Note that the gear teeth 9 (see FIG. 5) have been omitted from FIGS. 11 and 12.

Figure 14A:
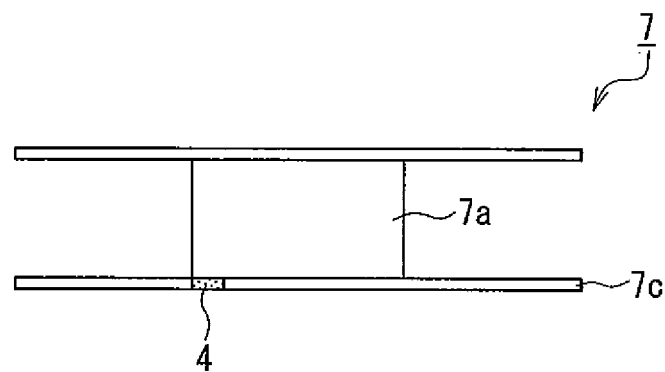
FIG. 14A is a frontal schematic diagram illustrating yet another example of a reel according to an embodiment of the present invention.
Figure 14B:
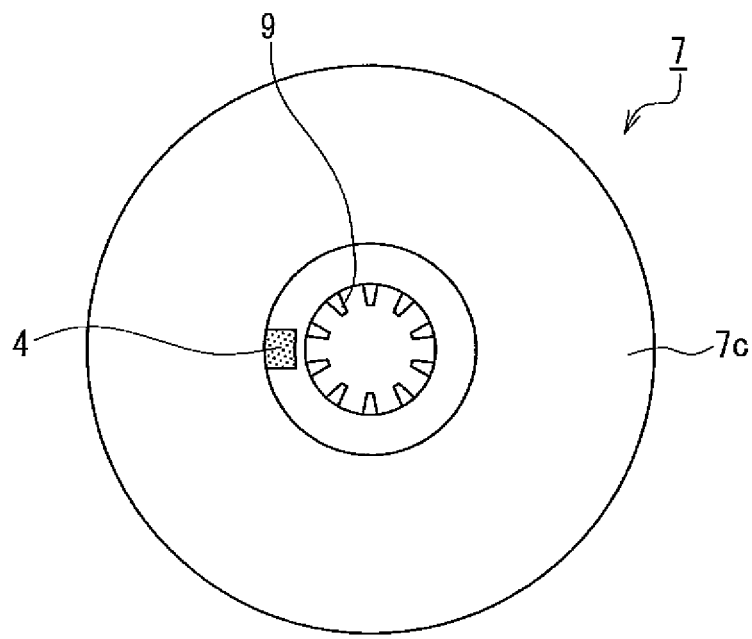
FIG. 14B is a schematic plan view of the reel illustrated in FIG. 14A.

Although the plurality of gear teeth 9 are formed in the base portion of the hub portion 7a in the example described above, the position in which the gear teeth 9 are formed is not limited thereto. For example, the gear teeth 9 may be formed on the inner surface of the cylindrical portion of the hub portion 7a, as shown in FIG. 14.

In addition, although there is one positioning mark 4 in the example described above, the number of positioning marks 4 is not particularly limited, and there may be a plurality of positioning marks 4 as long as the effects of the present invention can be achieved.

Figure 15A:
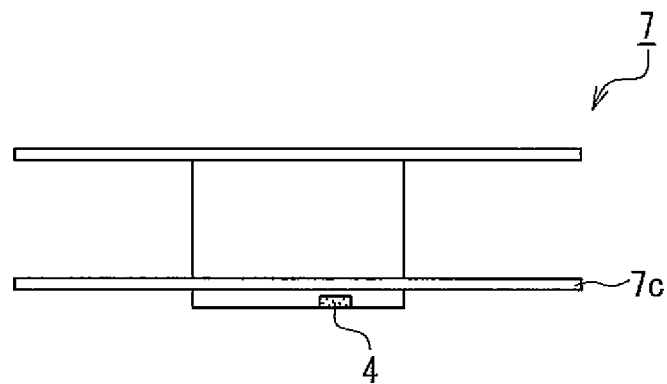
FIG. 15A is a frontal schematic diagram illustrating yet another example of a reel according to an embodiment of the present invention.
Figure 15B:
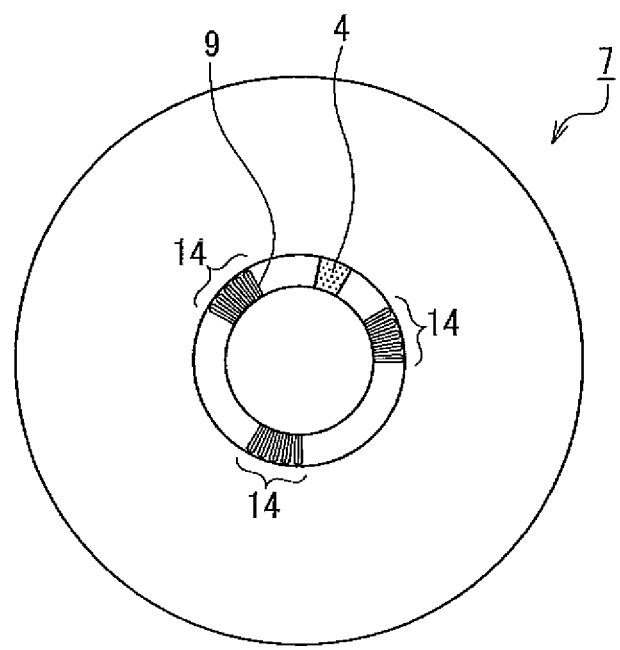
FIG. 15B is a schematic plan view of the reel illustrated in FIG. 15A.

Finally, although the number of gear teeth 9 is not particularly limited, the number of teeth may be reduced as long as a sufficient engagement strength between the reel engaging portion 11 and the reel 7 can be secured. If the number of teeth are reduced and the formation precision of the gear teeth 9 is improved, it is possible to engage the reel 7 and reel engaging portion 11 through alignment of the specific gear tooth A91 and the specific engagement gear tooth B321, and to effectively suppress instability in the running position of the magnetic tape. To be more specific, it is preferable for the plurality of gear teeth 9 to be formed within regions 14 that are spaced out at intervals in the circumferential direction, as shown in FIG. 15. It is preferable for a plurality of regions 14 to be spaced out at even intervals in the circumferential direction, from the standpoint of ensuring a stable engagement. Moreover, it is preferable for the number of regions 14 to be three or more, from the standpoint of ensuring a strong engagement.

Embodiment 2

In Embodiment 2, an example of a recording and reproducing apparatus of the present invention and an example of an information recording and reproducing method of the present invention shall be described.

Figure 16:
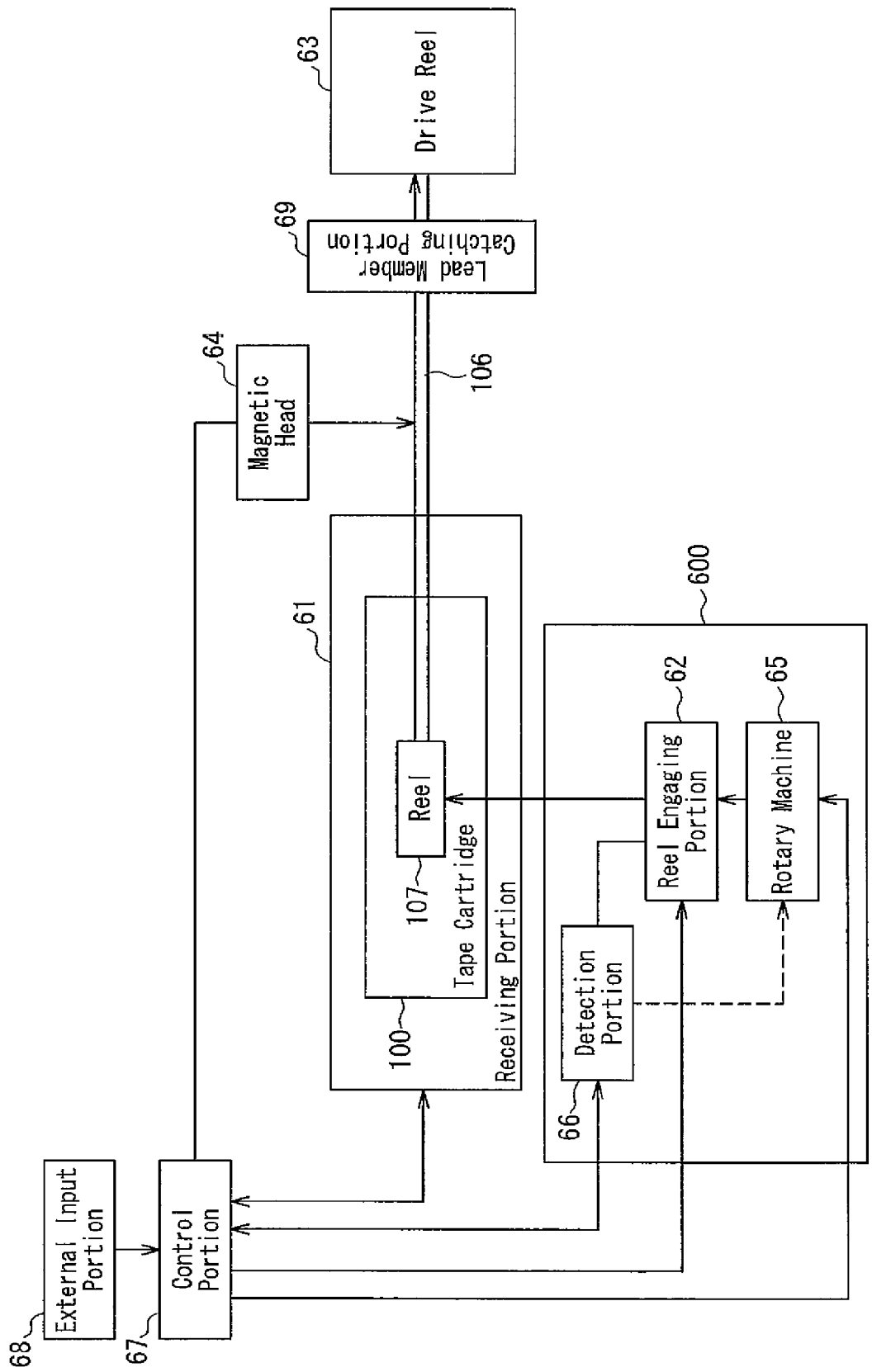
FIG. 16 is a block diagram illustrating an example of the recording and reproducing apparatus according to an embodiment of the present invention.

As shown in FIG. 16, the recording and reproducing apparatus of the present embodiment includes a receiving portion 61, a drive shaft 600, a drive reel 63, a magnetic head unit 64, an external input portion 68, and a control portion 67. The drive shaft 600 includes a rotary machine 65, a reel engaging portion 62, and a detection portion 66. The control portion 67 is capable of controlling the various operations of the receiving portion 61, the reel engaging portion 62, the drive reel 63, the magnetic head unit 64, the rotary machine 65, a lead member catching portion 69, and the detection portion 66.

The receiving portion 61 allows the tape cartridge 100 of Embodiment 1 to be housed. The functionality and configuration of the receiving portion 61 may be identical to those of a conventional recording and reproducing apparatus; the receiving portion 61 has a configuration and functionality for, for example, recognizing when the tape cartridge 100 has been loaded into the receiving portion 61 and notifying the control portion 67 thereof. In addition, the receiving portion 61 has a configuration and functionality for recognizing, via the control portion 67, a command to eject the tape cartridge 100 made through the external input portion 68, and for executing that command.

The reel engaging portion 62 has a plurality of engagement gear teeth 32 (see FIG. 6) capable of engaging with the plurality of gear teeth 9 (see FIG. 4) of the reel in the tape cartridge 100. The drive shaft 600 receives an instruction from the control portion 67, engages the reel engaging portion 62 with a reel 107, and for example, raises the reel in the case to a position along the drive system of the drive. In addition, the reel engaging portion 62 is rotated in the direction that lets out tape or the direction that takes up tape through the rotation of the rotary machine 65, which has received an instruction from the control portion 67.

The detection portion 66 is provided on the reel engaging portion 62, and is capable of detecting a positioning mark in the reel 107. The detection method used by the detection portion 66 may be selected in accordance with the form of the positioning mark 4 (see FIG. 4). For example, if the positioning mark 4 is a mirror surface with a higher degree of smoothness than its surroundings, the detection portion 66 may include, for example, a light source that emits laser light, and a light-receiving element that recognizes the reflected light of the light emitted form the light source. If the laser light is, for example, irradiated onto a gear tooth, the laser light will be reflected diffusely off of the sloped surface of the gear tooth, and thus the amount of reflected light that can be received by the light-receiving element will be low. In such a case, the control portion 67, for example, recognizes that the detection portion 66 is not facing the positioning mark 4, and thus the movement of the detection portion 66, or in other words, the rotation of the reel engaging portion, is commenced. When a sufficient amount of reflected light is recognized by the light-receiving element, or in other words, when the light reflected by the mirror surface is received by the detection portion 66, an instruction signal indicating that the rotation of the reel engaging portion 62 is to be stopped is sent to the rotary machine 65 by the control portion 67. Such differences in reflective characteristics make it possible for the detection portion 66 to detect the positioning mark. The same applies to the case where the positioning mark is a recessed or protruding step.

The type of laser light mentioned above is not particularly limited, and may be visible light, infrared light, ultraviolet light, or the like. The contactless detector used in the detection of the positioning mark is not limited to the contactless detector using light, such as laser light, and may=be the contactless detector using at least one selected from a group consisting of light, electromagnetic waves, and sound waves. When a different-colored surface is employed as the positioning mark, it is preferable for the detection portion 66 to include a means capable of recognizing differences in the color of the external surface, such as, for example, a color sensor. The same applies for the case where the positioning mark is a character or a code symbol.

The detection portion 66 commences the positioning mark detection process upon, for example, receiving an instruction signal from the control portion 67. The detection portion 66 is moved by the rotary machine 65 until the positioning mark has been detected.

The rotary machine 65 receives an instruction signal from the control portion 67, or receives an instruction signal directly from the detection portion 66, and then moves the detection portion 66, or in other words, rotates the reel engaging portion 62. It is preferable for the rotary machine 65 to double as a rotary machine for rotating the reel engaging portion 62 during recording/reproducing of information as well.

The functionality and configuration of the lead member catching portion 69 may be, for example, identical to those of a conventional recording and reproducing apparatus. The lead member catching portion 69 is capable of catching a lead member within the tape cartridge 100, pulling out the tape, and setting the lead member in the drive reel 63, based on an instruction from the control portion 67. Furthermore, the lead member catching portion 69 is capable of releasing the lead member based on an instruction from the control portion 67.

The drive reel 63 is capable of taking up tape 106 supplied by the tape cartridge 100. The functionality and configuration of the drive reel 63 may be, for example, identical to those of a conventional recording and reproducing apparatus. The drive reel 63 is capable of rotating in the direction that takes up the tape 106 or in the direction that lets out the tape 106, through a rotary machine in the drive reel 63.

The functionality and configuration of the magnetic head unit 64 may be, for example, identical to those of a conventional recording and reproducing=apparatus, and the magnetic head unit 64 is capable of recording information onto the tape 106 of the tape cartridge 100 and reproducing information recorded onto the tape 106 of the tape cartridge 100.

Meanwhile, the functionality and configuration of the external input portion 68 may be, for example, identical to those of a conventional recording and reproducing apparatus, and the external input portion 68 is manipulated by a user in order to provide instructions to the control portion 67 to record information onto the tape 106, reproduce information that has been recorded onto the tape 106, eject the tape cartridge from the recording and reproducing apparatus, or the like.

Figure 17:
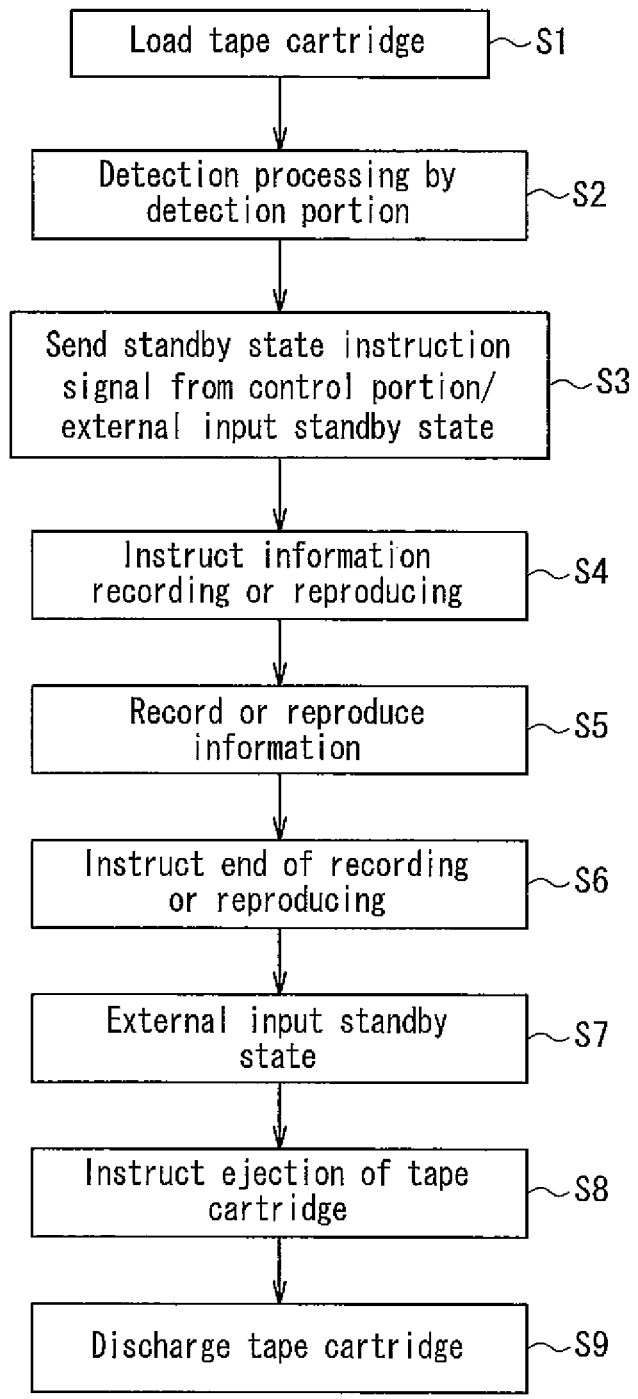
FIG. 17 is a flowchart illustrating an example of an information recording and reproducing method according to an embodiment of the present invention.
Figure 18:
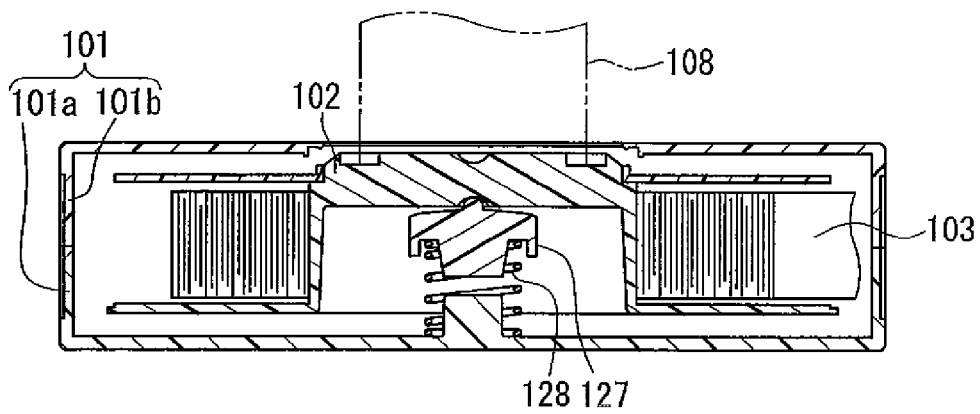
FIG. 18 is a cross-section illustrating an example of a conventional tape cartridge.
Figure 19:
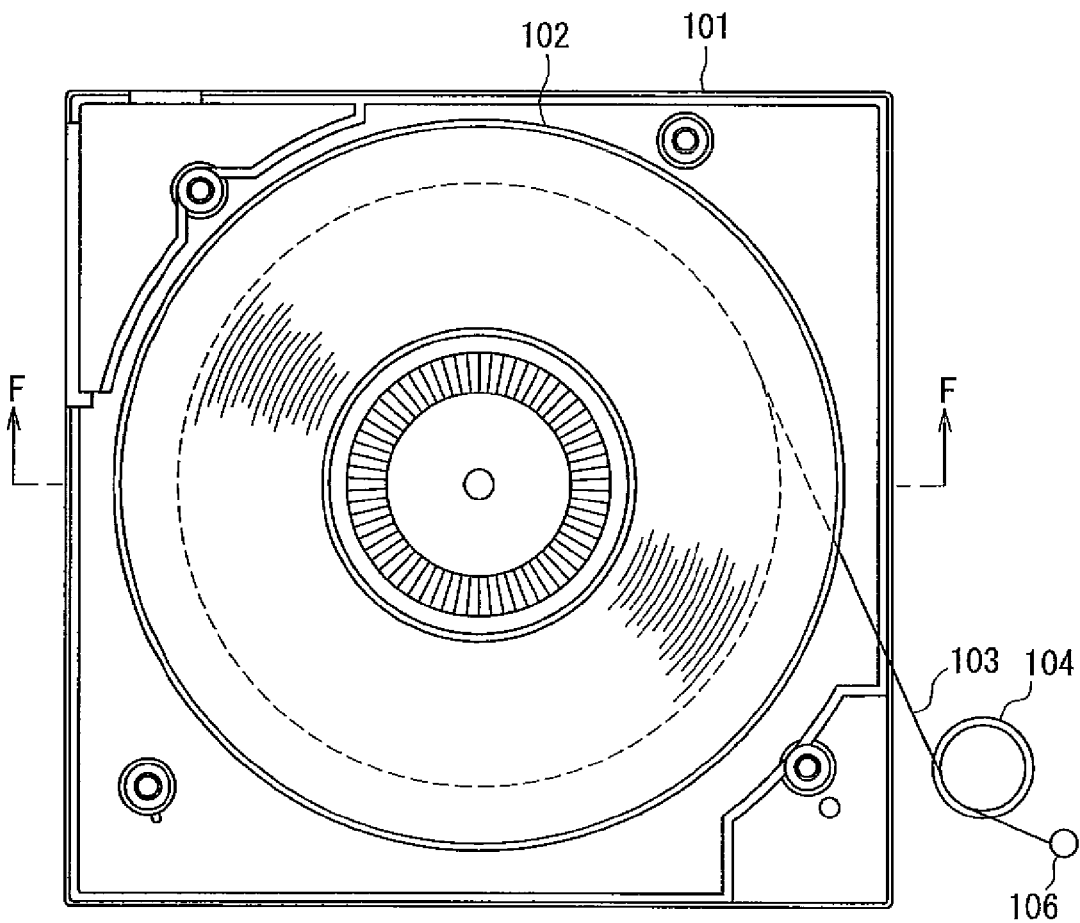
FIG. 19 is a plan view illustrating the interior structure of the conventional tape cartridge.

Next, an example of operations performed by the recording and reproducing apparatus of the present invention shall be described using FIGS. 16 and 17.

First, when the tape cartridge 100 is inserted into the receiving portion 61, the tape cartridge 100 is put, by the receiving portion 61, into a position in which the distance between the reel 107 and the reel engaging portion 62 is a predetermined distance. Furthermore, the receiving portion 61 recognizes that the tape cartridge 100 has been loaded, and communicates this to the control portion 67 through a signal (S1). This recognition is performed, for example, using a sensor or the like.

Next, the positioning mark detection process is performed by the detection portion 66 that has received the instruction signal from the control portion 67 (S2). In the case where the positioning mark cannot be immediately detected, a signal instructing the rotary machine 65 to rotate the reel engaging portion 62 at a predetermined speed is sent to the rotary machine 65 via the control portion 67 or directly from the detection portion 66. The sending of this signal from the control portion 67 may be set in the control portion 67 so as to be performed, for example, in the case where the control portion 67 has not received a detection signal from the detection portion 66 even after a predetermined amount of time has passed following an instruction signal instructing the cartridge 100 to be moved closer to the drive shaft 600 being sent from the control portion 67 to the receiving portion 61. The detection process performed by the detection portion 66 and the rotation of the reel engaging portion 62 by the rotary machine 65 are performed continuously until the positioning mark has been detected.

When the detection of the positioning mark by the detection portion 66 has, for example, been recognized by the control portion 67, an instruction signal instructing, for example, the rotary machine 65 to stop rotation is sent to the rotary machine 65 from the control portion 67, and the rotation of the rotary machine 65 is stopped. Then, the reel engaging portion 62 is rotated in the reverse direction at a speed slower than the stated predetermined speed, and the positioning mark is re-detected. When the re-detection of the positioning mark by the detection portion 66 has, for example, been recognized by the control portion 67, an instruction signal instructing the rotary machine 65 to stop rotation is once again sent to the rotary machine 65 from the control portion 67, and the rotation of the rotary machine 65 is stopped. This allows the alignment of the specific gear tooth A and the specific engagement gear tooth B to be performed quickly and accurately, and is thus preferable.

Next, a standby state instruction signal is sent by the control portion 67 to the drive shaft 600, including the reel engaging portion 62, the rotary machine 65, and the detection portion 66, and to the drive reel 63 and the lead member catching portion 69; the drive shaft 600 receives the stated signal from the control portion 67, engages the reel 107 and the reel engaging portion 62, and raises the reel 107 in the case to a position along the drive system of the drive. Through this, the specific engagement gear tooth B of the reel engaging portion 62 and the specific gear tooth A of the reel 107 are engaged. The control portion 67 may be set to send the stated standby state instruction signal after, for example, a predetermined amount of time has passed following the re-sending of the instruction signal for stopping the rotation. It is preferable for this predetermined amount of time to be slightly longer than the time required to stop the rotation of the rotary machine 65.

Next, when the lead member within the tape cartridge 100 is caught by the lead member catching portion 69, part of the tape is pulled out, and the lead member is set in the drive reel 63, the rotary machine 65 and the drive reel 63 simultaneously begin to rotate, and a predetermined length of tape 106 is taken out from the reel 107. The predetermined length of tape that has been taken out is taken up by the drive reel 63, and the tape cartridge 100 then enters an external input standby state. The control portion 67 may bet set so that the standby state instruction signal (rotation instruction signal) is sent to the rotary machine 65 and the rotary machine of the drive reel 63 following the passage of the amount of time required to set the lead member in the drive reel 63 (S3).

Next, when, for example, an instruction to record or reproduce information is made using the external input portion 68 (S4), that instruction signal is sent to the rotary machine 65, the drive reel 63, and the magnetic head unit 64 via the control portion 67. The rotary machine 65 then rotates in the direction that lets out the tape 106, and the drive reel 63 rotates in the direction that takes up the tape 106 that has been let out. The magnetic head unit 64 then begins recording information to or reproducing information from the tape 106 (S5).

Next, when a recording or reproducing stop instruction has been made using the external input portion 68, that instruction signal is sent to the rotary machine 65, the drive reel 63, and the magnetic head unit 64 via the control portion 67. At this time, the rotary machine 65 and drive reel 63 stop rotating, and the magnetic head unit stops recording/reproducing. As a result, the recording and reproducing apparatus and the tape cartridge 100 once again enter the external input standby state (S6 and S7).

Next, a command to eject the tape cartridge 100 is made through the external input portion 68 (S8), and that instruction signal is sent by the control portion 67 to the drive shaft 600 including the reel engaging portion 62, the rotary machine 65, and the detection portion 66, and to the drive reel 63. The rotary machine 65 and the drive reel 63 then rotate, completely taking up the tape 106 onto the reel 107. At the same time as the tape 106 is completely taken up, the lead member catching portion 69 releases the lead member, and the lead member is returned to its specific position within the cartridge.

When the lead member catching portion 69 releases the lead member, the drive shaft receives an engagement release signal sent from the control portion 67; the drive shaft moves away from the reel 107, and the engagement of the reel engaging portion 62 and the reel 107 is released. The tape cartridge is then discharged from the receiving portion 61 (S9). The control portion 67 may be set so that a tape cartridge discharge signal is sent to the receiving portion 61 after the amount of time required to release the engagement of the reel engaging portion 62 and the reel 107 has passed.

In Embodiment 1, a tape cartridge provided with a single reel is given as an example of the tape cartridge of the present invention, but the tape cartridge of the present invention is not intended to be limited thereto, and may include two reels. In such a case, the recording and reproducing apparatus need not be provided with a drive reel.

As described thus far, according to the present invention, it is possible to provide, with respect to the repeated engagement of a reel engaging portion and a reel, a reel capable of suppressing instability in the attitude, position, and the like of the reel when the reel engaging portion and the reel are engaged, a tape cartridge that uses such a reel, a recording and reproducing apparatus for recording and reproducing information in the tape cartridge, and an information recording and reproducing method for the recording and reproducing apparatus.

The present invention can suppress instability in the running position of magnetic tape, and therefore can suppress the chance of damage such as folded edges being dealt to the tape; the present invention can therefore suppress the occurrence of errors during loading and the like. Accordingly, the present invention is useful in the fields of magnetic tape reels, magnetic tape cartridges, recording and reproducing apparatuses, and information recording and reproducing methods.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape reel that has a plurality of gear teeth capable of engaging with a plurality of engagement gear teeth provided with a reel engaging portion of a recording and reproducing apparatus and upon which magnetic tape can be wound, the reel comprising:
    a hub portion including a cylindrical portion upon which the magnetic tape can be wound and the plurality of gear teeth; and
    a positioning mark capable of being detected using a contactless detector, the positioning mark being provided for aligning a specific gear tooth A from the plurality of gear teeth with a specific engagement gear tooth B from the plurality of engagement gear teeth,
    wherein the hub portion has a closed-end cylindrical shape, and
    the plurality of gear teeth are provided on an external surface of a base portion of the hub portion having a closed-end cylindrical shape,
    the magnetic tape reel further comprising:
    a first flange extending in a radial direction from a peripheral surface of one end of the hub portion; and
    a second flange extending in a radial direction from a peripheral surface of the other end of the hub portion that is closer to the base portion than the one end,
    wherein the positioning mark is provided on the external surface of the base portion of the hub portion, and
    the positioning mark is detected by a detection portion that is provided on the reel engaging portion of the recording and reproducing apparatus.

2. The magnetic tape reel according to claim 1, further comprising:
    a flange extending in the radial direction from the outer periphery of the hub portion,
    wherein the positioning mark is provided on the flange.

3. The magnetic tape reel according to claim 1, wherein the positioning mark is at least one selected from a group consisting of a surface of a different color than the color surrounding the positioning mark, a mirror surface, a recessed or protruding step, a through-hole, a character, and a code symbol.

4. A tape cartridge comprising:
    the magnetic tape reel according to claim 1;
    magnetic tape wound upon the magnetic tape reel; and
    a case that has a space capable of housing the magnetic tape reel and the magnetic tape and that has an opening portion that enables the plurality of gear teeth of the magnetic tape reel to be exposed to the exterior of the case.

5. A recording and reproducing apparatus for recording information onto and reproducing information from the tape cartridge according to claim 4, the apparatus comprising:
    a receiving portion that allows the tape cartridge to be housed; a reel engaging portion that has a plurality of engagement gear teeth capable of engaging with the plurality of gear teeth provided with the magnetic tape reel, the plurality of engagement gear teeth including a specific engagement gear tooth B capable of being constantly engaged with the specific gear tooth A;
    a magnetic head unit capable of recording information onto the magnetic tape and reproducing information that has been recorded onto the magnetic tape;
    a detection portion that is provided on the reel engaging portion that is capable of detecting the positioning mark of the magnetic tape reel; and a rotary machine capable of rotating the reel engaging portion.

6. An information recording and reproducing method for recording information onto and reproducing information from the tape cartridge using the recording and reproducing apparatus according to claim 5, the method comprising the steps of:

detecting the positioning mark using the detection portion;

engaging the specific gear tooth A from the plurality of gear teeth with the specific engagement gear tooth B from the plurality of engagement gear teeth; and recording information onto the magnetic tape or reproducing information that has been recorded onto the magnetic tape.

7. The information recording and reproducing method according to claim 6, wherein in the detecting step, the specific gear tooth A and the specific engagement gear tooth B are aligned by stopping the rotation of the reel engaging portion after the positioning mark has been detected by the detection portion while rotating the reel engaging portion at a predetermined speed using the rotary machine and then rotating the reel engaging portion in the reverse direction at a speed slower than the predetermined speed and re-detecting the positioning mark.

* * * * *